United States Patent
Lee et al.

(10) Patent No.: US 9,521,388 B2
(45) Date of Patent: Dec. 13, 2016

(54) METHOD FOR PLAY SYNCHRONIZATION AND DEVICE USING THE SAME

(71) Applicant: Samsung Electronics Co., Ltd., Gyeonggi-do (KR)

(72) Inventors: Keum-koo Lee, Gyeonggi-do (KR); Hee-jeong Choo, Gyeonggi-do (KR); Ju-yun Sung, Gyeonggi-do (KR); Hyun-joo Oh, Seoul (KR); Min-jeong Moon, Gyeonggi-do (KR); Ji-young Kwahk, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/814,001

(22) Filed: Jul. 30, 2015

(65) Prior Publication Data

US 2015/0334363 A1    Nov. 19, 2015

Related U.S. Application Data

(63) Continuation of application No. 13/734,496, filed on Jan. 4, 2013, now Pat. No. 9,131,206, which is a (Continued)

(30) Foreign Application Priority Data

Aug. 24, 2009 (KR) .......................... 10-2009-0078326

(51) Int. Cl.
*H04N 5/92* (2006.01)
*H04N 9/80* (2006.01)
(Continued)

(52) U.S. Cl.
CPC .......... *H04N 9/8722* (2013.01); *H04N 21/414* (2013.01); *H04N 21/4307* (2013.01); *H04N 21/4788* (2013.01); *H04N 21/6587* (2013.01)

(58) Field of Classification Search
CPC ............... H04N 9/8722; H04N 21/414; H04N 21/4307; H04N 21/6587
(Continued)

(56) References Cited

U.S. PATENT DOCUMENTS

| 8,271,625 B2 | 9/2012 | Kwon et al. |
| 8,316,154 B2 | 11/2012 | Yoneda |

(Continued)

FOREIGN PATENT DOCUMENTS

| CN | 2676538 | 2/2005 |
| CN | 1914601 | 2/2007 |

(Continued)

OTHER PUBLICATIONS

Notice of Acceptance dated May 15, 2015 issued in counterpart application No. 2010287252.
(Continued)

*Primary Examiner* — Robert Chevalier
(74) *Attorney, Agent, or Firm* — The Farrell Law Firm, P.C.

(57) ABSTRACT

Methods and apparatuses are provided for providing contents. A plurality of contents is reproduced at the first device. The plurality of contents is transmitted from the first device to a second device to reproduce, in the second device, content in synchronization with the first device. Data is received from an external device during the reproducing of the plurality of contents at the first device. The received data is reproduced along with at least one of the plurality of contents being reproduced at the first device. The received data is transmitted from the first device to the second device. The transmitted data is used to enable the second device to reproduce the transmitted data together with the at least one of the plurality of contents.

12 Claims, 6 Drawing Sheets

Related U.S. Application Data continuation of application No. 12/862,427, filed on Aug. 24, 2010, now Pat. No. 8,364,005.

(51) Int. Cl.
*H04N 9/87* (2006.01)
*H04N 21/43* (2011.01)
*H04N 21/4788* (2011.01)
*H04N 21/414* (2011.01)
*H04N 21/6587* (2011.01)

(58) Field of Classification Search
USPC ........ 386/245, 239, 248, 282, 326, 200, 235
See application file for complete search history.

(56) References Cited

U.S. PATENT DOCUMENTS

| | | | |
|---|---|---|---|
| 2002/0067909 | A1 | 6/2002 | Iivonen |
| 2002/0099774 | A1 | 7/2002 | Yamato et al. |
| 2003/0088875 | A1 | 5/2003 | Gay et al. |
| 2005/0197578 | A1 | 9/2005 | Aratani et al. |
| 2007/0069973 | A1 | 3/2007 | Gerbacia et al. |
| 2007/0107039 | A1 | 5/2007 | Miyakawa et al. |
| 2007/0133764 | A1 | 6/2007 | Goldberg |
| 2008/0037489 | A1* | 2/2008 | Yitiz ................ H04M 1/72522 370/338 |
| 2008/0177822 | A1 | 7/2008 | Yoneda |
| 2008/0256378 | A1 | 10/2008 | Guillorit |
| 2008/0267283 | A1 | 10/2008 | Smith et al. |
| 2009/0094653 | A1 | 4/2009 | Shields |
| 2010/0088401 | A1* | 4/2010 | DeGraeve ............... H04L 67/06 709/223 |
| 2010/0232771 | A1 | 9/2010 | Prestenback et al. |
| 2011/0021251 | A1* | 1/2011 | Linden ................ G06F 1/1616 455/566 |
| 2011/0248863 | A1* | 10/2011 | Johnson ............... G08B 27/006 340/686.1 |

FOREIGN PATENT DOCUMENTS

| | | |
|---|---|---|
| CN | 101072359 | 11/2007 |
| CN | 101212823 | 7/2008 |
| JP | 10-187148 | 7/1998 |
| JP | 2000-221964 | 8/2000 |
| JP | 2002-218277 | 8/2002 |
| JP | 2003-271750 | 9/2003 |
| JP | 2003-337783 | 11/2003 |
| JP | 2006-268442 | 10/2006 |
| JP | 2008-097168 | 4/2008 |
| JP | 2008-135995 | 6/2008 |
| JP | 2009-100470 | 5/2009 |
| KR | 1020040106949 | 12/2004 |
| KR | 100746048 | 7/2007 |
| KR | 1020090014586 | 2/2009 |
| WO | WO 2009/048882 | 4/2009 |

OTHER PUBLICATIONS

European Search Report dated Feb. 20, 2015 issued in counterpart application No. 10173891.2-1908.
Russian Office Action dated Aug. 27, 2014 issued in a counterpart application No. 2012111352/28.
Japanese Office Action dated Sep. 2, 2014 issued in a counterpart application No. 2010-187069.
Australian Examination Report dated Oct. 30, 2014 issued in a counterpart application No. 2010287252.
Chinese Office Action dated Nov. 19, 2014 issued in counterpart application No. 201010260487.9.
Japanese Office Action dated Jan. 19, 2015 issued in counterpart application No. 2010-187069.
Australian Examination Report dated Feb. 4, 2015 issued in counterpart application No. 2010287252.
Summons to Attend Oral Proceedings dated Nov. 3, 2015 issued in counterpart application No. 10173891.2-1908, 6 pages.
Korean Office Action dated Nov. 5, 2015 issued in counterpart application No. 10-2009-0078326, 7 pages.
Japanese Office Action dated Apr. 18, 2016 issued in counterpart application No. 2010-187069, 11 pages.
Australian Examination Report dated Oct. 13, 2016 issued in counterpart application No. 2015218540, 4 pages.

* cited by examiner

FIG. 3

| TIME | $t_1$ | $t_2$ | $t_3$ | | $t_{99}$ |
|---|---|---|---|---|---|
| VIDEO | P1 | P2 | P3 | ... | P100 |
| SUBTITLE | T1 | - | T3 | ... | T100 |
| AUDIO | - | A2 | - | ... | A100 |

METHOD FOR PLAY SYNCHRONIZATION AND DEVICE USING THE SAME

PRIORITY

This application is a Continuation application of U.S. application Ser. No. 13/734,496, which was filed in the U.S. Patent and Trademark Office (USPTO) on Jan. 4, 2013, which is a Continuation application of U.S. application Ser. No. 12/862,427, which was filed in USPTO on Aug. 24, 2010, now U.S. Pat. No. 8,364,005, issued on Jan. 29, 2013, which claims priority under 35 U.S.C. §119(a) to Korean Patent Application No. 10-2009-0078326, filed on Aug. 24, 2009, in the Korean Intellectual Property Office, the contents of each of which are incorporated herein by reference.

BACKGROUND OF THE INVENTION

1. Field of the Invention

The present invention relates generally to a method for play synchronization and a device using the same, and more particularly, to a method for playing contents through a plurality of devices and a device using the same.

2. Description of the Related Art

With the advent of digital devices, users today have a variety of digital devices at their disposal.

Digital devices assist in bringing about convenience and affluence. Digital technology has been developed quickly in recent years, thereby achieving even higher performance and diversity.

However, people continue to seek answers in digital devices of even higher performance and functionality.

There is a limit in the amount of function that a single digital device can provide. Accordingly, digital devices are required to operate in convergence to create a new function that the digital device cannot provide alone.

SUMMARY OF THE INVENTION

The present invention has been made to address at least the above problems and/or disadvantages and to provide at least the advantages described below.

Accordingly, an aspect of the present invention provides a method of play synchronization and a device using the same, according to which devices other than a first device can play the same content as the first device.

According to one aspect of the present invention, a method is provided for providing contents. A plurality of contents is reproduced at the first device. The plurality of contents is transmitted from the first device to a second device to reproduce, in the second device, content in synchronization with the first device. Data is received from an external device during the reproducing of the plurality of contents at the first device. The received data is reproduced along with at least one of the plurality of contents being reproduced at the first device. The received data is transmitted from the first device to the second device. The transmitted data being is to enable the second device to reproduce the transmitted data together with the at least one of the plurality of contents.

According to another aspect of the present invention, a device is provided for synchronizing content play operation among devices. The device includes a memory for storing a plurality of contents. The device also includes a communication unit for communicating with another device. The device further includes a processor for reproducing the plurality of contents, transmitting the plurality of contents to the other device to reproduce content in synchronization with the device, receiving data from an external device during the reproducing of the content at the device, providing the received data along with at least one of the plurality of contents and transmitting the received data to the other device, the transmitted data being used to enable the other device to reproduce the transmitted data together with the at least one of the plurality of contents.

According to an additional aspect of the present invention, a system system is provided for synchronizing content play operation between a first device and a second device. The system includes the first device that reproduces a plurality of contents, transmits the plurality of contents to the second device, reproduces data along with at least one of the plurality of contents being reproduced at the first device when the data is received from an external device during the reproducing of the plurality of contents at the first device, and transmits the received data to the second device. The system also includes the second device that receives the plurality of contents from the first device, reproduces the plurality of contents, receives the data from the first device, and reproduces the data together with the at least one of the plurality of contents.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings.

In the following description, the same or similar drawing reference numerals may be used for the same elements even in different drawings. The matters defined in the description, such as detailed construction and elements, are provided to assist in a comprehensive understanding of the present inventive concept. Accordingly, it is apparent that the embodiments of the present invention can be carried out without those specifically defined matters. Also, detailed descriptions of constructions or processes known in the art may be omitted to avoid obscuring the subject matter of the present invention.

Furthermore, in the following description, an electronic frame is exemplified as the device for convenience of explanation. However, it is apparent that the inventive concept is not limited to this specific example, but applicable to various other examples. For example, an electronic book or a Large Format Display (LFD) may be implemented as the device.

1. Play Synchronization of Electronic Frames by Sharing a Manipulation Command

Figure 1:
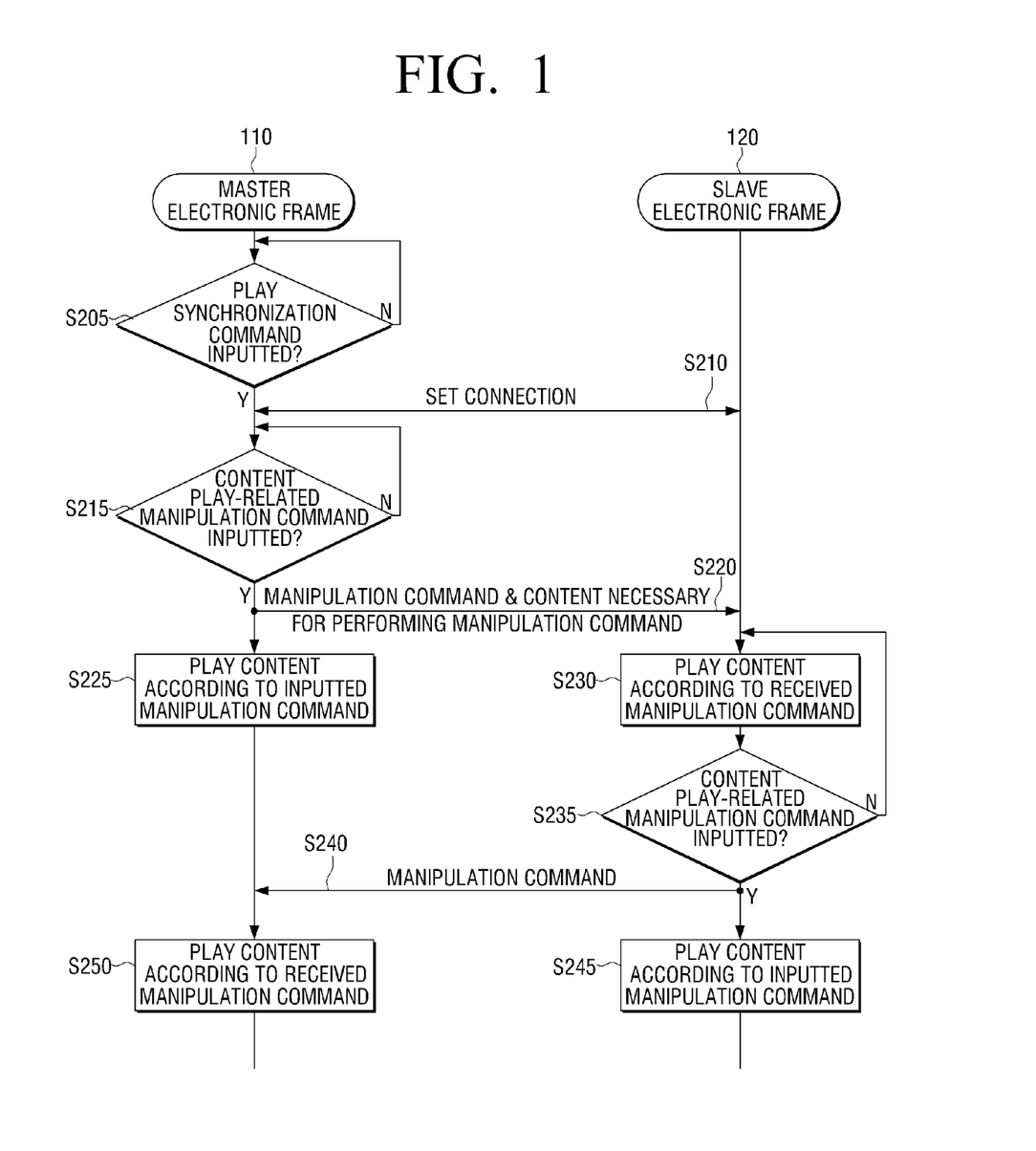
FIG. 1 is a flow diagram illustrating a play synchronization process of electronic frames at remote distances, according to an embodiment of the present invention.

FIG. 1 is a flow diagram illustrating a process of play synchronization of electronic frames at remote distances, according to an embodiment of the present invention. The term 'play synchronization' refers to a state in which a plurality of electronic frames play the same content in a real-time basis.

In the specific example explained below, it is assumed that the play synchronization is performed such that all the electronic frames share a manipulation command inputted to one of the electronic frames, as will be explained in greater detail below.

Referring to FIG. 1, if a play synchronization command is inputted to a master electronic frame 110 at step S205, the master electronic frame 110 sets a connection so as to enable communication with a slave electronic device 120 in step S210.

If the connection setting at step S210 is completed, the master electronic frame 110 receives a manipulation command related to content play from a user at step S215.

The manipulation command inputted at step S215 may include: i) a command to play selected content; ii) a command to pause; iii) a command to stop; iv) a command to play the next content; v) a command to play the previous content; and vi) a command to set visual effect in case of a change of content/edit.

The command to play selected content may be directed to play not only one type of content, but also other types of content.

Herein, the phrase 'to play one type of content' may include: a) to play photo content only; or b) to play video content only.

Herein, the phrase 'to play video content only' may include: b1) to play photo content together with audio content; b2) to play photo content together with text content; b3) to play audio content together with text content; or b4) to play photo content together with audio and text contents.

The term 'text content' herein may include: c1) content including a text regarding an additional explanation about photo content; and c2) content including an additional explanation or lyrics of the audio content. The text included in the text content may be generated by the user.

The term 'audio content' herein may include: d1) music content; and d2) content including a voice explaining the photo content. In the latter's case, the voice may be generated by the user.

If the manipulation command related to the content play is inputted at step S215, the master electronic frame 110 transmits the inputted manipulation command related to the content play, and content necessary to perform the inputted manipulation command, to the slave electronic frame 120, in step S220.

The content transmitted at step S220 may vary depending on the manipulation command inputted at step S215, which will be explained in greater detail below.

If the manipulation command inputted at step S215 directs to play only one selected content, only one selected content is transmitted at step S220.

If the manipulation command inputted at step S215 directs to play the selected different types of content together, the selected different types of content are transmitted at step S220.

If the manipulation command inputted at step S215 directs to play the next content, the next content is transmitted at step S220.

If the manipulation commands include the command to pause, the command to stop, the command to play the previous content, or the command to set visual effect in case of content change/edit, the manipulation command is transmitted alone at step S220.

If the transmission of the manipulation command and the content is completed between the master electronic frame 110 and the slave electronic frame 120, at step S225, the master electronic frame 110 performs the manipulation command inputted at step S215.

At step S230, during the operation of step S225, the slave electronic frame 120 also performs the manipulation command received at step S220.

Since the master electronic frame 110 and the slave electronic frame 120 play the same content at steps S225 and S230, the operations of the two are in synchronization with each other.

If a user inputs a manipulation command related to the content play to the slave electronic frame 120 during the synchronized content play at step S235, the slave electronic frame 120 transmits the inputted command related to the content play to the master electronic frame 110 in step S240.

If the transmission of the manipulation command between the slave electronic frame 120 and the master electronic frame 110 is completed, at step S245, the slave electronic frame 120 performs the manipulation command inputted at step S235.

During the operation of step S245, the master electronic frame 110 also performs the manipulation command received at step S240, at step S250.

As a result, the master electronic frame 110 and the slave electronic frame 120 are able to bi-directionally synchronize the operation of the content.

If the devices are implemented as electronic books, the devices may synchronize with respect to the text content played by the electronic book, and if the devices are implemented as LFDs, the devices may synchronize with respect to the advertisement content played by the LFD.

2. Play Synchronization of Electronic Frames Through Sharing of a Timeline

Figure 2:
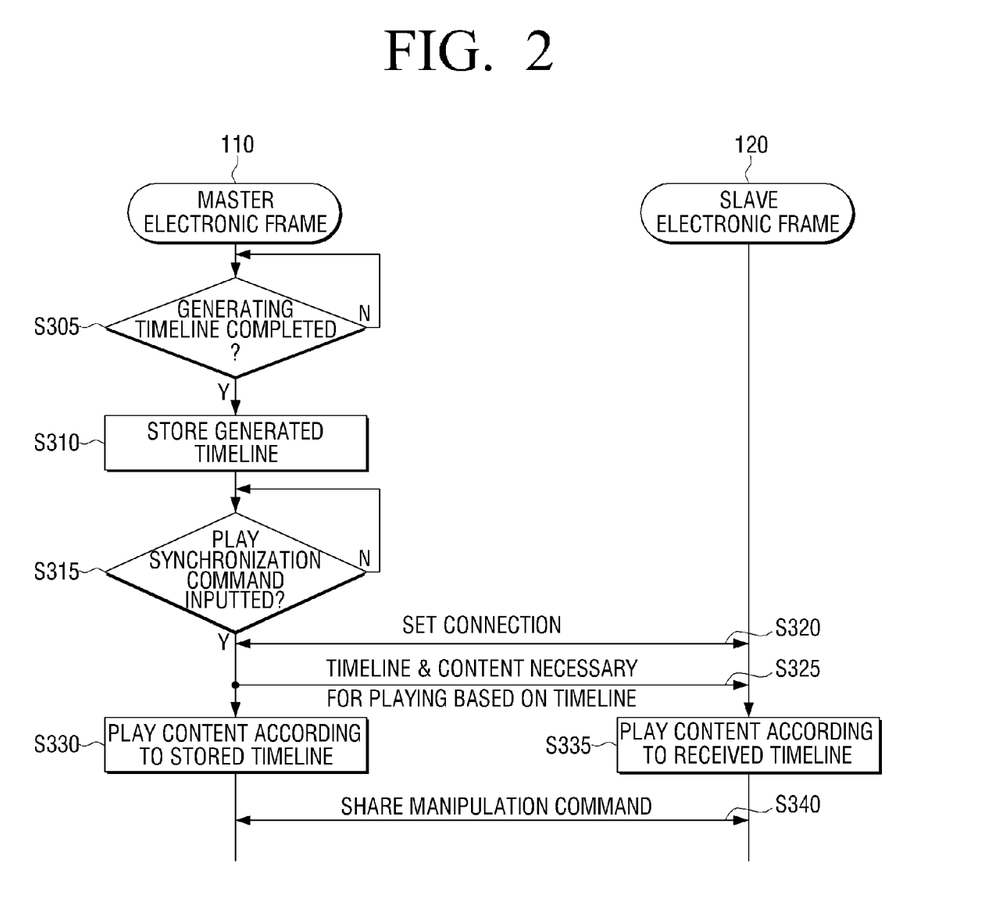
FIG. 2 is a flow diagram illustrating a play synchronization process of electronic frames at remote distances, according to another embodiment of the present invention.

FIG. 2 is a flow diagram illustrating the play synchronization of the electronic frames at remote distances, according to another embodiment of the present invention. The play synchronization is exemplified as being performed by the electronic frames in a manner of sharing a timeline, as will be explained in greater detail below.

Referring to FIG. 2, if a user generates a timeline using the master electronic frame 110 at step S305, the master electronic frame 110 stores the generated timeline at step S310.

Figure 3:
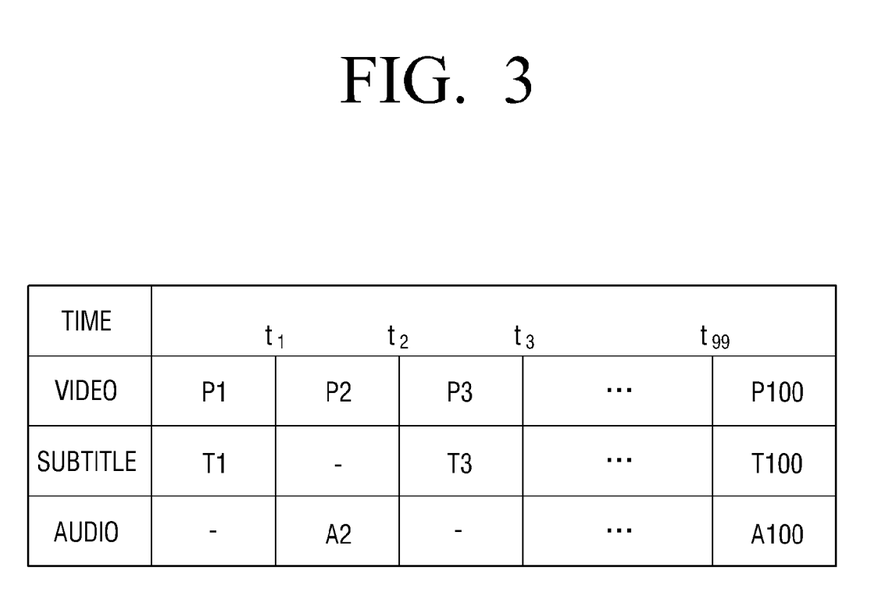
FIG. 3 is a diagram illustrating an example of a timeline, according to an embodiment of the present invention.

The term 'timeline' refers to a project file related to playing different types of content which have a previously set play order and respective intervals, and also related to content play according to time. FIG. 3 illustrates one example of the timeline, according to an embodiment of the present invention.

The timeline exemplified in FIG. 3 enables playing of photo, audio and text contents in combination. Specifically, the timeline illustrated in FIG. 3 sets the playing in a manner such that, 1) for video effect, photos are played in a sequence of photo-1 (P1)→photo-2 (P2)→photo-3 (P3)→ . . . →photo-100 (P100);

2) for subtitle effect, texts are played in a sequence of text-1 (T1)→text-2 (T2)→text-3 (T3)→ . . . →text-100 (T100) along with the playing of photo-1 (P1)→photo-2 (P2)→photo-3 (P3)→ . . . →photo-100 (P100), respectively; and 3) for audio effect, audios are played in a sequence of audio-2 (A2)→audio-3 (A3)→ . . . →audio-100 (A100) along with the playing of photo-2 (P2)→photo-3 (P3)→ . . . →photo-100 (P100), respectively.

Referring back to FIG. 2, if a user inputs a command to synchronize the play operation using the master electronic frame 110 in step S315, the master electronic frame 110 sets a connection so as to be able to communicate with the slave electronic frame 120 in step S320.

If the connection is set at step S320, the master electronic frame 110 transmits the timeline stored at step S310 and the contents necessary for playing by the timeline to the slave electronic frame 120, at step S325. In one example, if the connection is set at step S320, the master electronic frame 110 may transmit the timeline stored at step S310 and the location information of the contents necessary for playing by the timeline in the master electronic frame 110, to the slave electronic frame 120. As a result, the slave electronic frame 120 is able to play the content according to the location information and the timeline.

If the transmission of the timeline and the contents between the master electronic frame 110 and the slave electronic frame 120 is completed, at step S330, the master electronic frame 110 plays the contents according to the timeline stored at step S310.

During the operation of step S330, the slave electronic frame 120 also plays the contents according to the received timeline, at step S335.

Since the master electronic frame 110 and the slave electronic frame 120 play the contents based on the same timeline at steps S330 and S335, the content play operations are synchronized with each other.

During the synchronized content play operation, the master electronic frame 110 and the slave electronic frame 120 may share the manipulation command at step S340.

In one example, the content play by the manipulation command may be given a higher priority than the content play by the timeline. Additionally, the timeline-based content play operation may resume if a predetermined time lapses from the completion of the command-based content play operation without input of additional manipulation command.

Since the sharing of the manipulation command between the master electronic frame 110 and the slave electronic frame 120 can be easily inferred from FIG. 1, additional explanation is omitted for the sake of brevity.

The slave electronic frame 120 may store the timeline received at step S325. In this case, the slave electronic frame 120 may be able to play the content according to the stored timeline as necessary.

As described above, since the information related to the playing of the content is provided instead of directly providing content to the corresponding devices to synchronize the content play operations of the devices, the contents can be synchronously played in a real-time basis.

3. Generating Text Content Using a Mobile Phone

The text content may be provided for additional explanation about the photo content, and may generated by the user.

Figure 4:
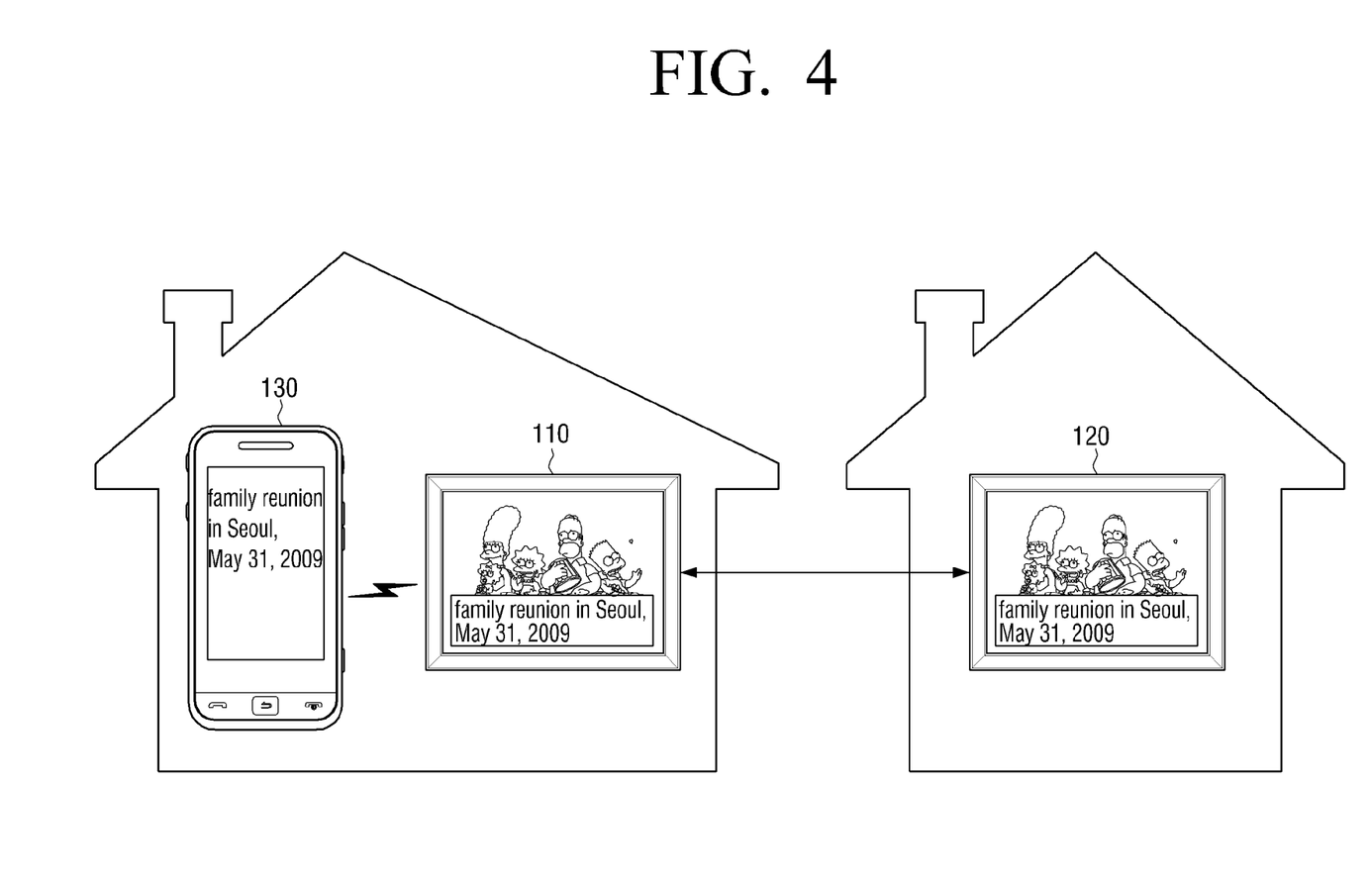
FIG. 4 is a diagram illustrating generation of text content using a mobile phone, according to an embodiment of the present invention.

The user may input the text content using a text-input keyboard screen displayed on the master electronic frame 110, or through a mobile phone 130 as the one illustrated in FIG. 4.

There is no time limit for generating the text content using the mobile phone 130. Typically, the text content is generated before the content play synchronization, but the text content may also be generated after the content play synchronization starts.

FIG. 4 is a diagram illustrating an example where the text content is generated through the mobile phone 130 after the content play synchronization has begun, according to an embodiment of the present invention. The master electronic frame 110 receives the text content generated through the mobile phone 130, and displays the received text content in a manner overlapping the currently-played photo content.

Additionally, the master electronic frame 110 transmits the text content to the slave electronic frame 120 so that the slave electronic frame 120 also displays the received text content in a manner overlapping the same photo content.

Although the text content is explained as being generated using the mobile phone, this is only for illustrative purposes, and therefore, the same process may be applied to other devices including electronic books, or LFDs.

4. Generating Audio Content Using a Mobile Phone

The audio content may be provided for additional explanation about the photo content, and may be generated by the user.

If the master electronic frame 110 is equipped with a microphone, the user may generate audio content using the microphone. If the master electronic frame 110 has no microphone, the user may generate the audio content using the mobile phone 130, as illustrated in FIG. 5.

There is no time limit for generating the audio content using the mobile phone 130. Typically, the audio content would have been generated before the content play synchronization, but it may also be generated after the content play synchronization starts.

Figure 5:
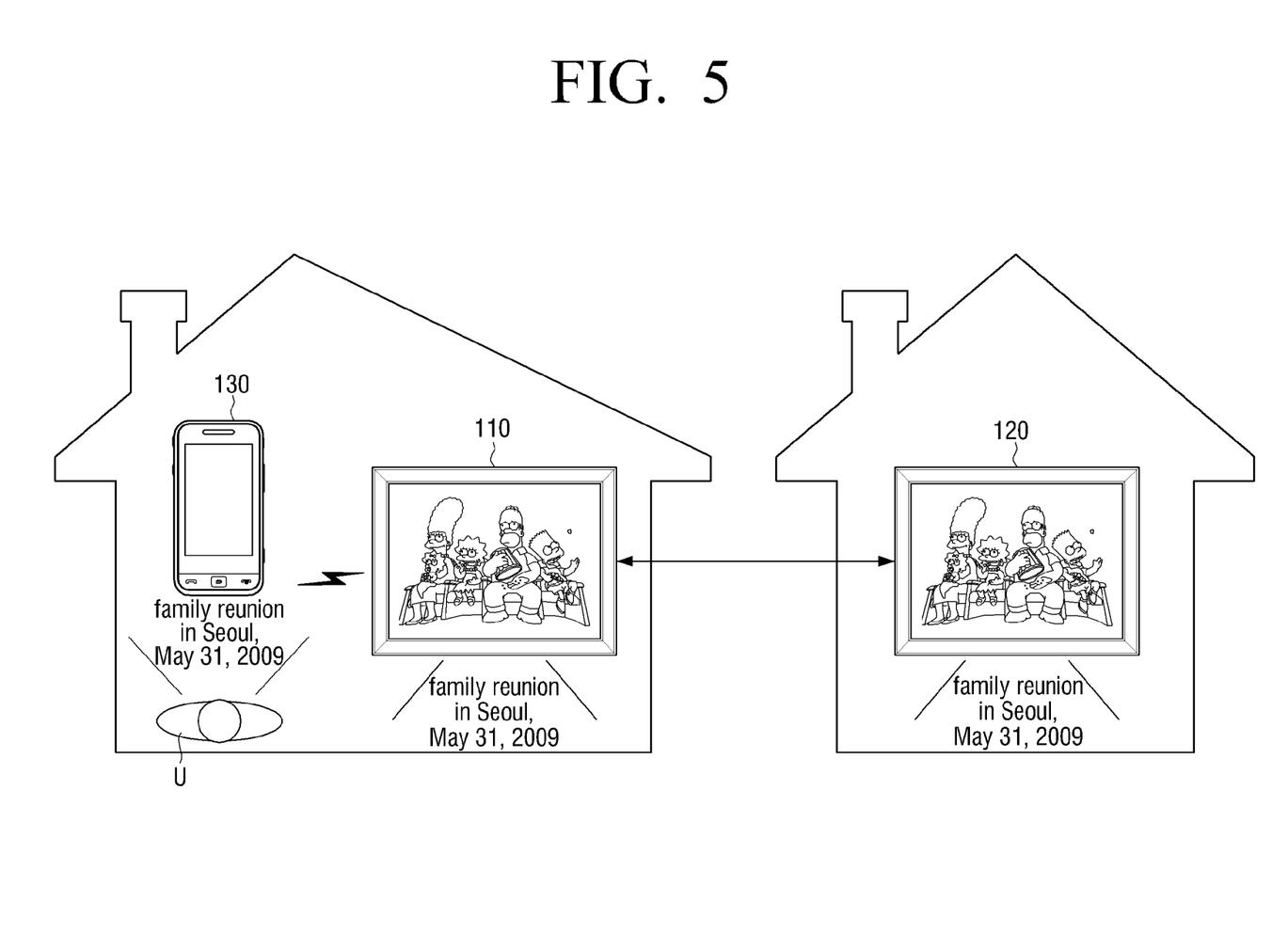
FIG. 5 is a diagram illustrating generation of audio content using a mobile phone, according to an embodiment of the present invention.

FIG. 5 is a diagram illustrating an example where the audio content is generated through the mobile phone 130 after the content play synchronization has begun, according to an embodiment of the present invention. Referring to FIG. 5, the master electronic frame 110 receives the audio content generated through the mobile phone 130, and plays the received audio content along with the currently-played photo content.

Additionally, the master electronic frame 110 transmits the audio content to the slave electronic frame 120 so that the slave electronic frame 120 plays the received audio content together with the same photo content.

Although the audio content is explained as being generated using the mobile phone, this is only for illustrative purposes, and therefore, the same process may be applied to other devices including electronic books, or LFDs.

5. Deleting Content

The operations performed among the devices in response to a command to delete the stored content from the master electronic frame 110, are described below according to an embodiment of the present invention.

If a command to delete the stored content from the master electronic frame 110 is inputted, the master electronic frame 110 deletes the content according to the inputted command, and may transmit the delete command to the slave electronic frame 120 so that the slave electronic frame 120 also deletes the content.

Alternatively, if a command to delete the stored content is inputted to the master electronic frame 110, the master electronic frame 110 may not delete the content, but transmit the command to the slave electronic frame 120 so that the slave electronic frame 120 deletes the corresponding content. In other words, the content may not be deleted from the master electronic frame 110, but from the slave electronic frame 120, when the command to delete the stored content is inputted to the master electronic frame 110.

6. Others

In the examples explained above, the synchronization of content play operations between the master electronic frame 110 and the slave electronic frame 120 are initiated in response to the input of a user's command to start the synchronization. However, this is described only for illustrative purposes, and other examples are possible.

For example, if the user previously sets the slave electronic frame 120 as the synchronization device for the master electronic frame 110 in terms of the content play operation, the two devices may perform synchronization of content play operations without requiring a user's command. Specifically, the user may only need to input 'manipulation command related with content play' or 'command to play according to timeline' to initiate the synchronization between the master electronic frame 110 and the slave electronic frame 120.

7. Detailed Structure of the Devices 7.1 Electronic Frame

Figure 6:
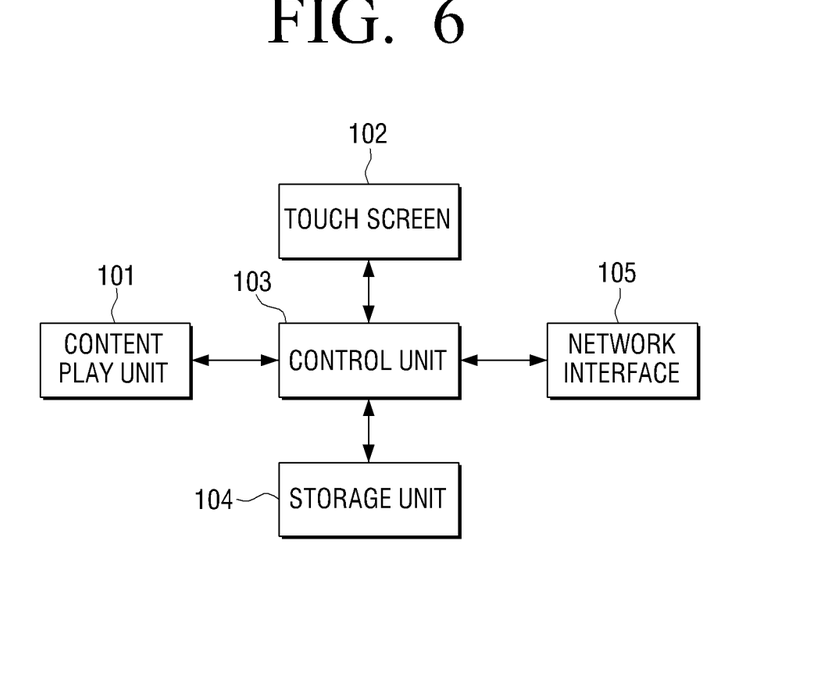
FIG. 6 is a detailed block diagram illustrating an electronic frame, according to an embodiment of the present invention.

FIG. 6 is a detailed block diagram of the master electronic frame 110 and the slave electronic frame 120, according to an embodiment of the present invention. In the description below, both electronic frames 110, 120 are referred to as the 'electronic frame'.

Referring to FIG. 6, an electronic frame may include a content play unit 101, a touch screen 102, a control unit 103, a storage unit 104, and a network interface 105.

The content play unit 101 has the main function of the electronic frame, specifically, the playing the stored content from the storage unit 104.

The touch screen 132 may function as a display, i.e., displaying the content played by the content play unit 101 and the Graphical User Interface (GUI), and may function as an input, i.e., receiving a user command inputted in the form of touching.

The storage unit 104 provides a storage space to store the contents received from the external device through the network interface 105 or from the external networks.

The network interface 105 is communicatively connected to the nearby mobile phone 130 and other electronic frames, and may be communicatively connected to an external device that stores content therein or to an external network that provides the contents.

The control unit 103 controls the content play unit 101, the touch screen 102, the storage unit 104, and the network interface 105 to perform the operations illustrated in FIGS. 1 and 2.

7.2 Electronic Books

The structure of a master electronic book and a slave electronic book are described in detail below. Both electronic books are referred to as the 'electronic book'.

An electronic book may include a content play unit, a touch screen, a control unit, a storage unit, and a network interface.

The content play unit has the main function of the electronic book, specifically, the function of playing the stored text content from the storage unit.

The touch screen may function as a display, i.e., displaying the text content played by the content play unit and the GUI, and may function as an input, i.e., receiving a user command inputted in the form of touching. Additionally, the touch screen of the slave electronic book may display the effect as if the actual book page is flipped over, if the user turns the page of the electronic book, causing the text content on the master electronic book to be turned to the next page.

The storage unit provides a storage space to store the text contents received from the external device through the network interface or from the external networks.

The network interface is communicatively connected to the nearby mobile phone and other electronic books, and may be communicatively connected to an external device that stores text content therein or to an external network that provides the text content.

The control unit controls the content play unit, the touch screen, the storage unit, and the network interface to perform the operations illustrated in FIGS. 1 and 2.

7.3 Large Format Displays (LFDs)

The structure of a master LFD and a slave LFD are described in detail below. Both LFDs are referred to as the 'LFD'.

An LFD may include a content play unit, a touch screen, a control unit, a storage unit, and a network interface.

The content play unit has the main function of the LFD, specifically, the function of playing the stored advertisement content from the storage unit.

The touch screen may function as a display, i.e., displaying the advertisement content played by the content play unit and the GUI, and may function as an input, i.e., receiving a user command inputted in the form of touching.

The storage unit provides a storage space to store the advertisement contents received from the external device through the network interface or from the external networks.

The network interface is communicatively connected to the nearby mobile phone and other electronic books, and may be communicatively connected to an external device that stores advertisement content therein or to an external network that provides the advertisement content.

The control unit controls the content play unit, the touch screen, the storage unit, and the network interface to perform the operations illustrated in FIGS. 1 and 2.

7.4 Mobile Phones

Figure 7:
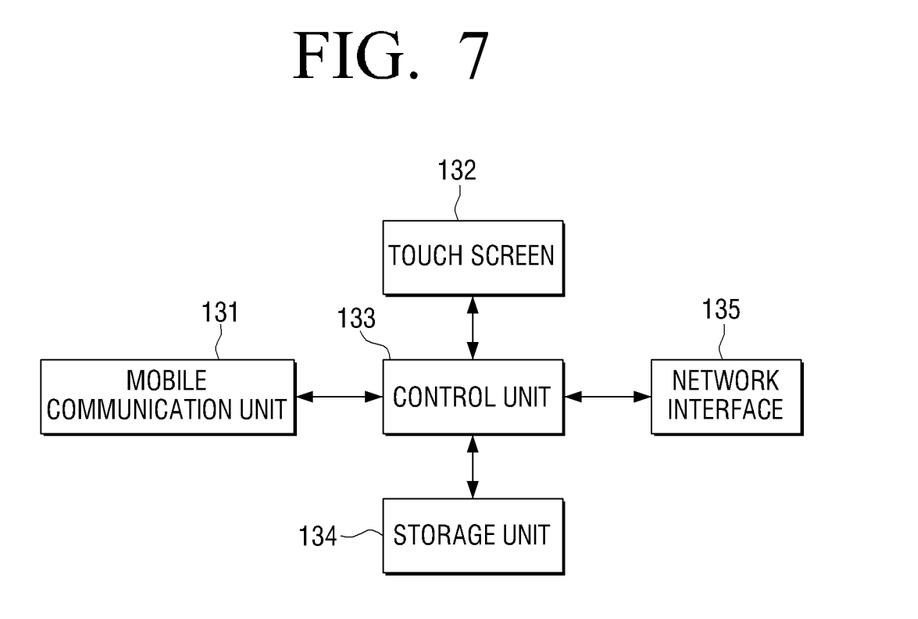
FIG. 7 is a detailed block diagram illustrating a mobile phone, according to an embodiment of the present invention.

FIG. 7 is a detailed block diagram of the mobile phone 130, according to an embodiment of the present invention. Referring to FIG. 7, the mobile phone 130 may include a mobile communication unit 131, a touch screen 132, a control unit 133, a storage unit 134, and a network interface 135.

The mobile communication unit 131 has the main and supplementary functions of the mobile phone 130, including functions such as, mobile phone calling, SMS, DMB broadcast reception, or photographing.

The touch screen 132 may function as a display, i.e., the function of displaying the screens necessary for the mobile phone calling or provision of SMS, DMB broadcast, contents, and the GUI, and may also function as an input, i.e., receiving a user command inputted in the form of touching.

The touch screen 132 may display the GUI including a text-input keyboard screen for use in generating the text content to be transmitted to the electronic frame.

The storage unit 134 provides a storage space to store the programs and data necessary for the driving of the mobile phone 130, and contents.

The network interface 135 is communicatively connected to the nearby electronic frame. The network interface 135 transmits the text content and the audio content, generated by the user, to the nearby electronic frames.

The control unit 133 controls the mobile communication unit 131, the touch screen 132, the storage unit 134, and the network interface 135 to perform the operations illustrated in FIGS. 1 and 2.

7.5 Other Devices

Although the electronic frames, mobile phone 130, electronic books, and LFDs are used as examples to explain certain embodiments of the present invention, it is understood that other types of devices can also be implemented.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for providing contents, comprising the steps of:
reproducing at least one content, at a device;
transmitting the at least one content from the device to a display device to reproduce, in the display device, the transmitted at least one content;
receiving a message from a mobile device during the reproducing of the at least one content at the device;
providing the received message while reproducing the at least one content at the device; and
transmitting, from the device, the received message to the display device, the transmitted message being used to enable the display device to provide the transmitted message while reproducing the at least one content.

2. The method of claim 1, further comprising:
when a manipulation command is inputted at the device, reproducing, at the device, the content according to the inputted manipulation command; and
transmitting, from the device, the manipulation command to the display device so that the display device reproduces according to the manipulation command.

3. The method of claim 1, further comprising:
when a command to delete the content is inputted at the device, transmitting, from the device, the command to delete to the display device so that the display device deletes the content according to the command to delete.

4. The method of claim 3, further comprising, when the command to delete the content is inputted at the device, deleting the content according to the inputted command to delete at the device.

5. The method of claim 1, wherein, when the device and the display device are electronic frames, the content comprises photo content or video content reproduced on the device and the display device.

6. The method of claim 1, wherein, when the device and the display device are electronic books, the content comprises text content reproduced on the device and the display device.

7. The method of claim 1, wherein, when the device and the display device are Large Format Displays (LFDs), the content comprises advertisement content reproduced on the device and the display device.

8. A device, comprising:
a memory for storing at least one content;
a communication unit for communicating with a display device;
a processor for reproducing the at least one content, transmitting the at least one content to the display device to reproduce the transmitted at least one content, receiving a message from a mobile device during the reproducing of the at least one content at the device, providing the received message while reproducing the at least one content and transmitting the received message to the display device, the transmitted message being used to enable the display device to provide the transmitted message together while reproducing the at least one content.

9. A system comprising a device and a display device, the system comprising:
the device that reproduces at least one content, transmits the at least one content to the display device, provides a message while reproducing the at least one content at the device when the message is received from a mobile device during the reproducing of the at least one content at the device, and transmits the received message to the display device; and
the display device that receives the at least one content from the device, reproduces the at least one content, receives the message from the device, and provides the message while reproducing the at least one content.

10. The device of claim 8, wherein when a manipulation command is inputted, the processor reproduces the content according to the inputted manipulation command and transmits the manipulation command to the display device so that the display device reproduces according to the manipulation command.

11. The device of claim 8, wherein when a command to delete the content is inputted, the processor transmits the command to delete to the display device so that the display device deletes the content according to the command to delete.

12. The device of claim 11, wherein when the command to delete the content is inputted, the processor deletes the content according to the inputted command to delete.

* * * * *